(12) United States Patent
White

(10) Patent No.: US 9,809,142 B1
(45) Date of Patent: Nov. 7, 2017

(54) TAILGATE TRUCK BED EXTENSION

(71) Applicant: Ernest S. White, Paris, TX (US)

(72) Inventor: Ernest S. White, Paris, TX (US)

( * ) Notice: Subject to any disclaimer, the term of this patent is extended or adjusted under 35 U.S.C. 154(b) by 0 days.

(21) Appl. No.: 15/065,504

(22) Filed: Mar. 9, 2016

(51) Int. Cl.
*B62D 33/023* (2006.01)
*B60P 1/64* (2006.01)
*B60P 1/00* (2006.01)
*E05B 85/00* (2014.01)

(52) U.S. Cl.
CPC ............ *B60P 1/6409* (2013.01); *B60P 1/003* (2013.01); *E05B 85/00* (2013.01)

(58) Field of Classification Search
CPC ....... B62D 21/14; B62D 33/08; B60P 1/6409; B60P 1/003; E05B 85/00
See application file for complete search history.

(56) References Cited

U.S. PATENT DOCUMENTS

| | | | |
|---|---|---|---|
| 2,852,303 A | 9/1958 | Hopson | |
| 3,245,714 A | 4/1966 | Blair | |
| 5,669,654 A | 9/1997 | Eilers et al. | |
| 5,820,188 A | 10/1998 | Nash | |
| 5,857,724 A * | 1/1999 | Jarman | B62D 33/037 296/26.11 |
| 5,934,725 A | 8/1999 | Bowers | |
| 6,155,622 A | 12/2000 | Reed | |
| 6,422,630 B1 | 7/2002 | Heaviside | |
| 6,513,850 B1 | 2/2003 | Reed | |
| 6,644,704 B1 | 11/2003 | Nyberg | |
| 6,994,389 B1 | 2/2006 | Graffy et al. | |
| 7,021,689 B1 * | 4/2006 | Weisbeck, III | B62D 33/0273 296/26.11 |
| 7,506,909 B2 | 3/2009 | Barnes | |
| 9,452,793 B1 * | 9/2016 | Quick | B62D 33/0273 |
| 2006/0214449 A1 * | 9/2006 | Klusmeier | B62D 33/0273 296/26.11 |
| 2007/0278813 A1 * | 12/2007 | Keehle | B62D 33/0273 296/61 |
| 2009/0195007 A1 * | 8/2009 | Miller | B60P 3/40 296/26.11 |
| 2010/0026027 A1 * | 2/2010 | Gao | B62D 33/0273 296/26.11 |
| 2014/0333083 A1 * | 11/2014 | Bzoza | B60R 5/041 296/26.11 |
| 2015/0225024 A1 * | 8/2015 | Newberry | B62D 33/0273 296/26.11 |
| 2016/0200373 A1 * | 7/2016 | Waskie | B62D 33/0273 296/26.11 |

* cited by examiner

*Primary Examiner* — Lori L Lyjak
(74) *Attorney, Agent, or Firm* — Richard L Miller

(57) ABSTRACT

An add-on extender for a pickup truck having a bed and a tailgate with a pair of sides and a top. The extender selectively extends both the bed and the tailgate of the pickup truck, and permanently mounts onto the tailgate of the pickup truck so as not to have to be removed when not in use. The extender includes a pair of side panels and a rear panel. The pair of side panels pivotally attach to the pair of sides of the tailgate of the pickup truck, respectively, so as to have a non-operational folded position and an operational unfolded position that extends the bed of the pickup truck. The rear panel pivotally attaches to the top of the tailgate of the pickup truck so as to have a non-operational folded position and an operational unfolded position that extends the bed and the tailgate of the pickup truck.

78 Claims, 12 Drawing Sheets

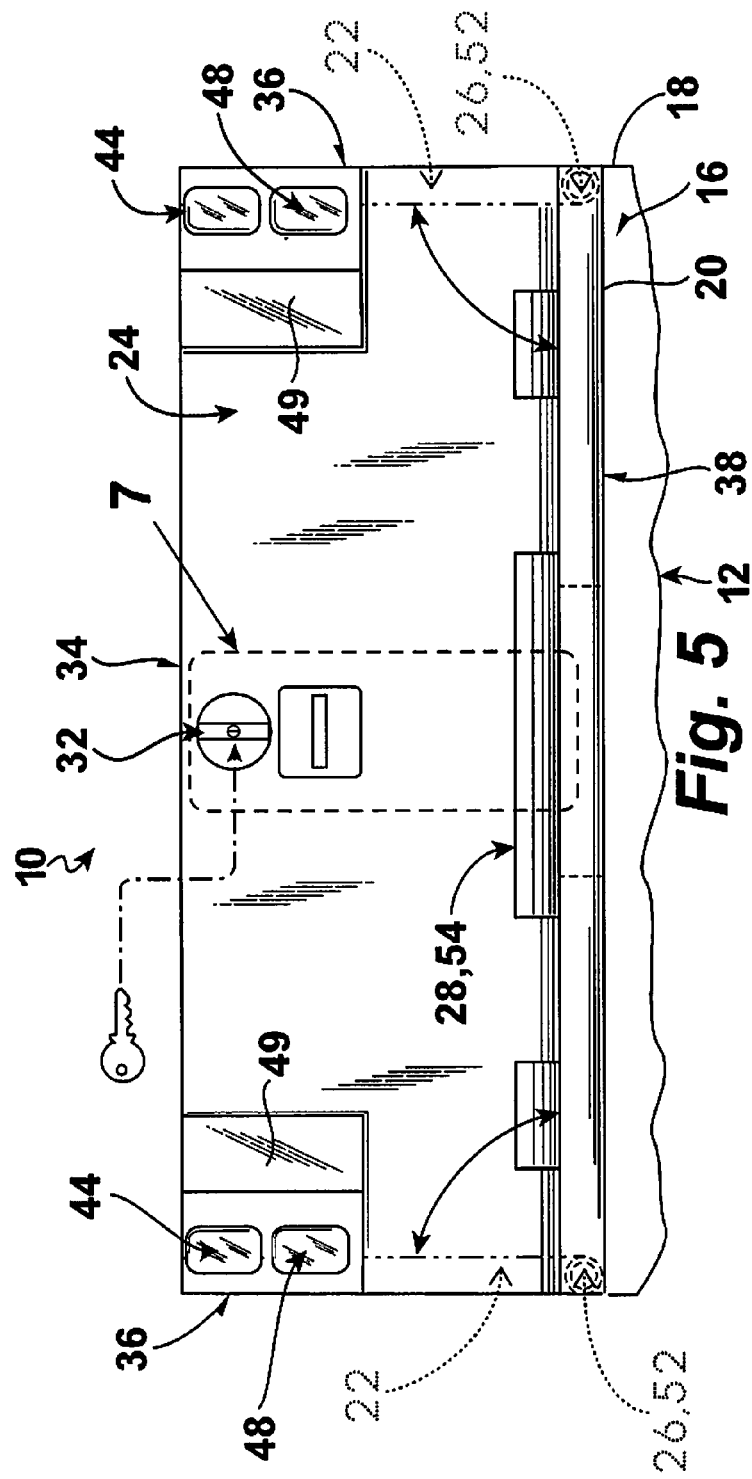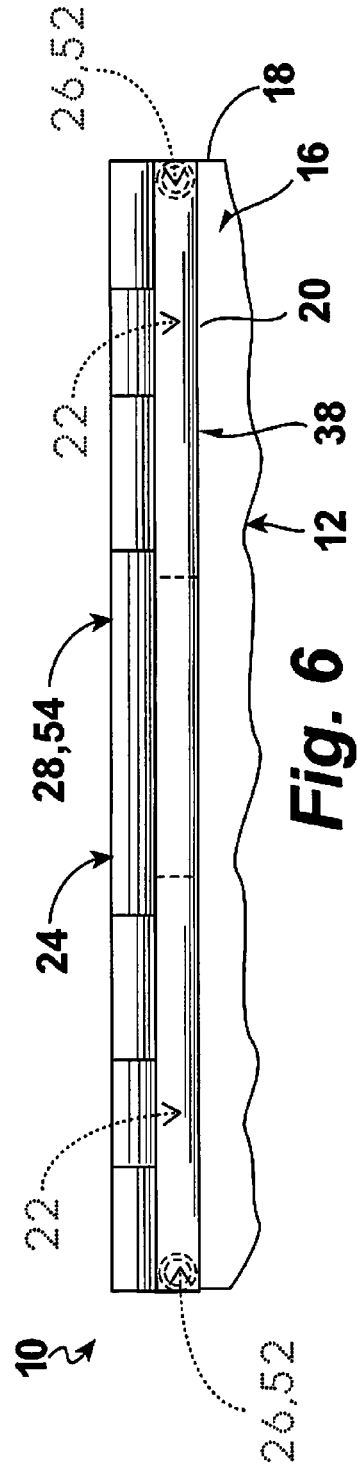

METHOD OF LOCKING AND UNLOCKING EACH OF THE PAIR OF SIDE HINGE LOCKS (30) AND THE TOP HINGE LOCK (32)
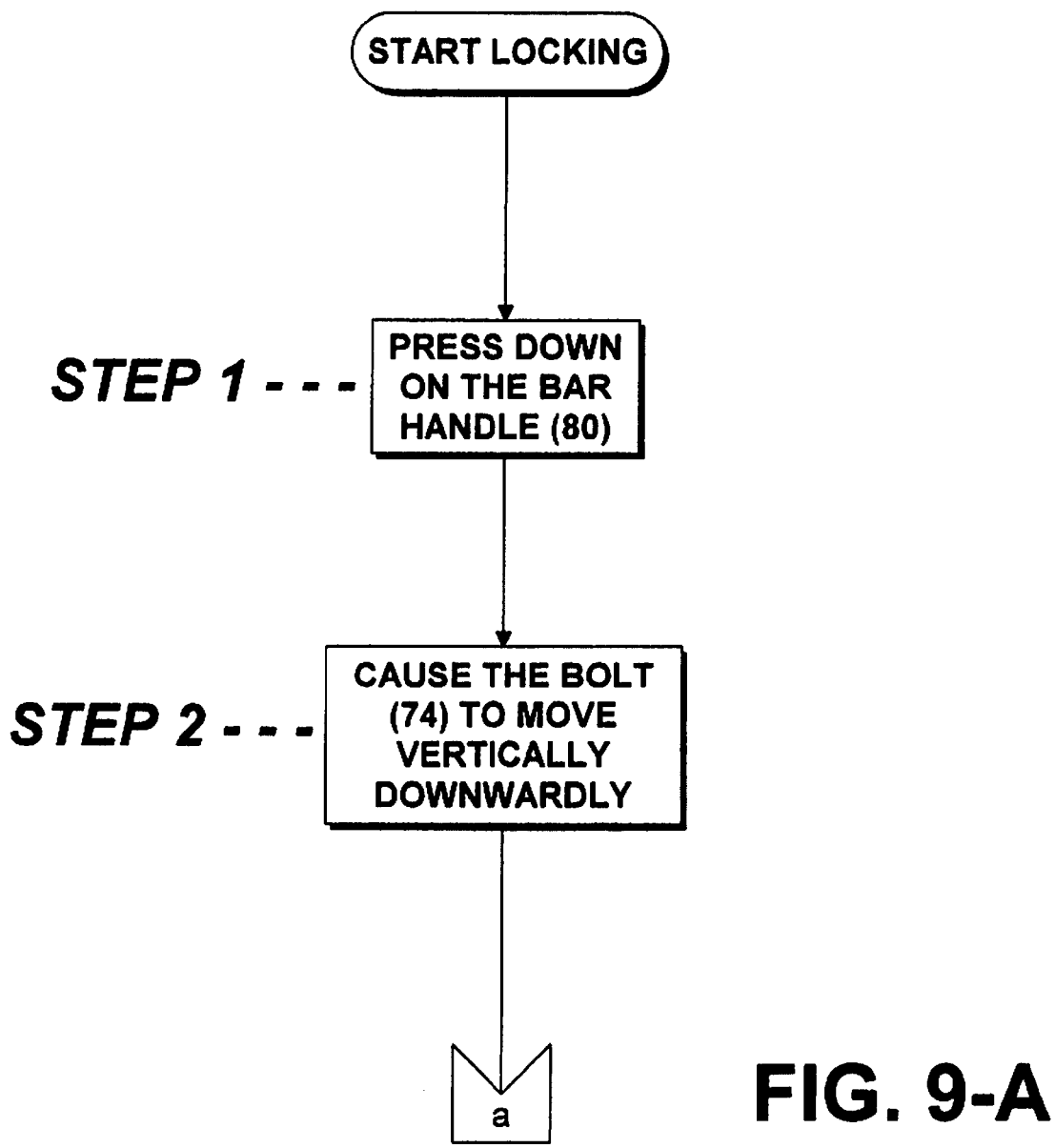
FIG. 9-A

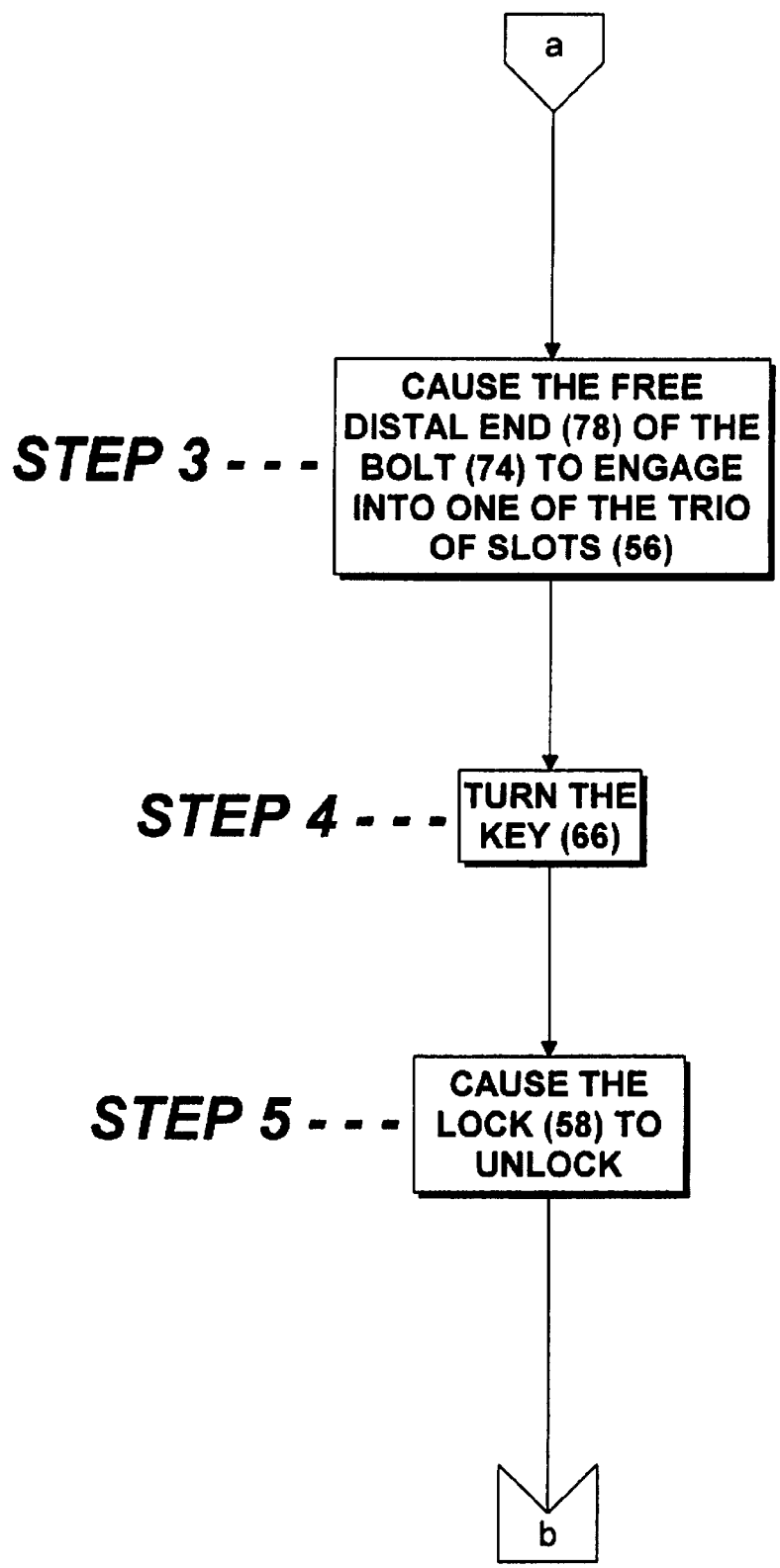
FIG. 9-B

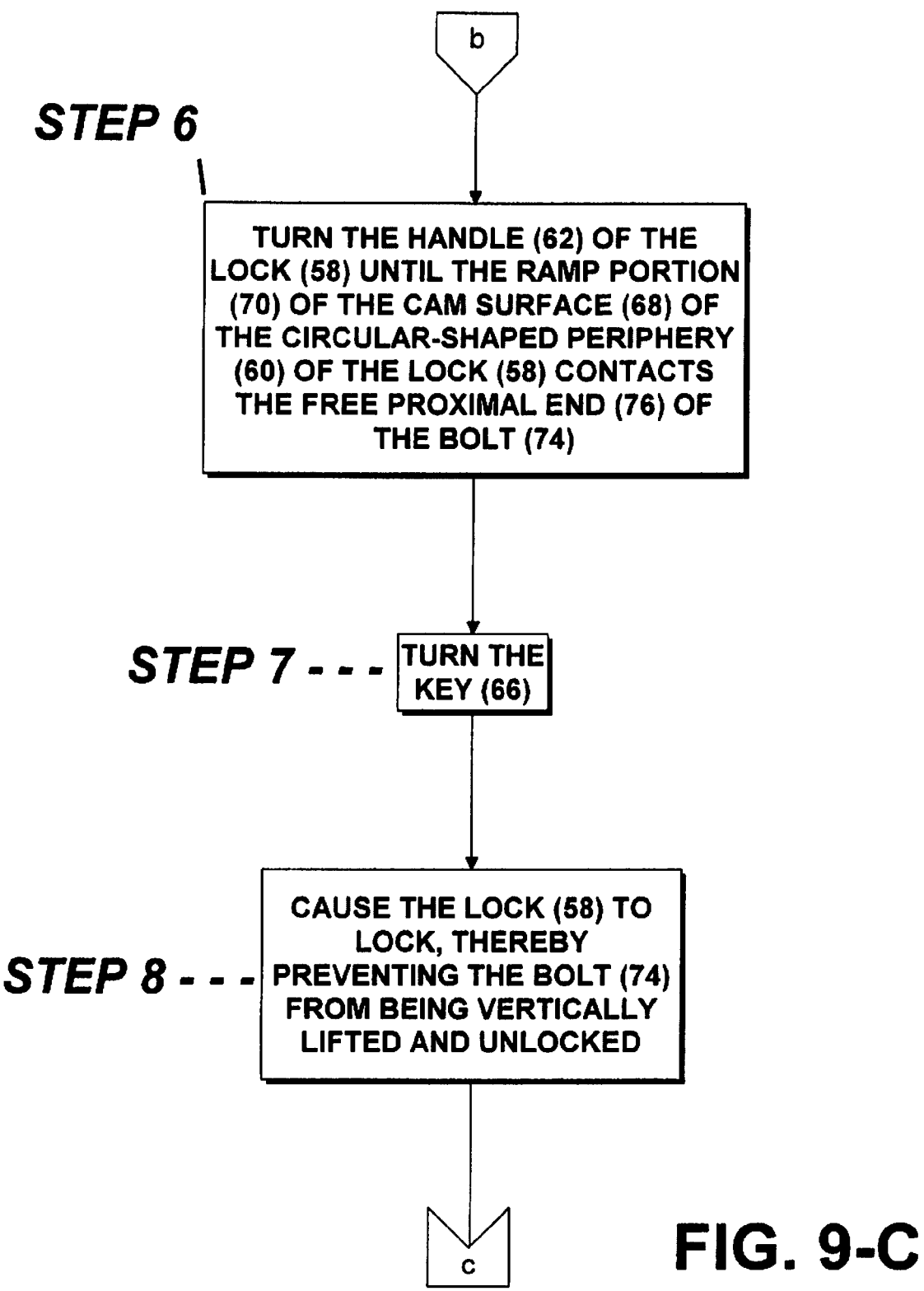
FIG. 9-C

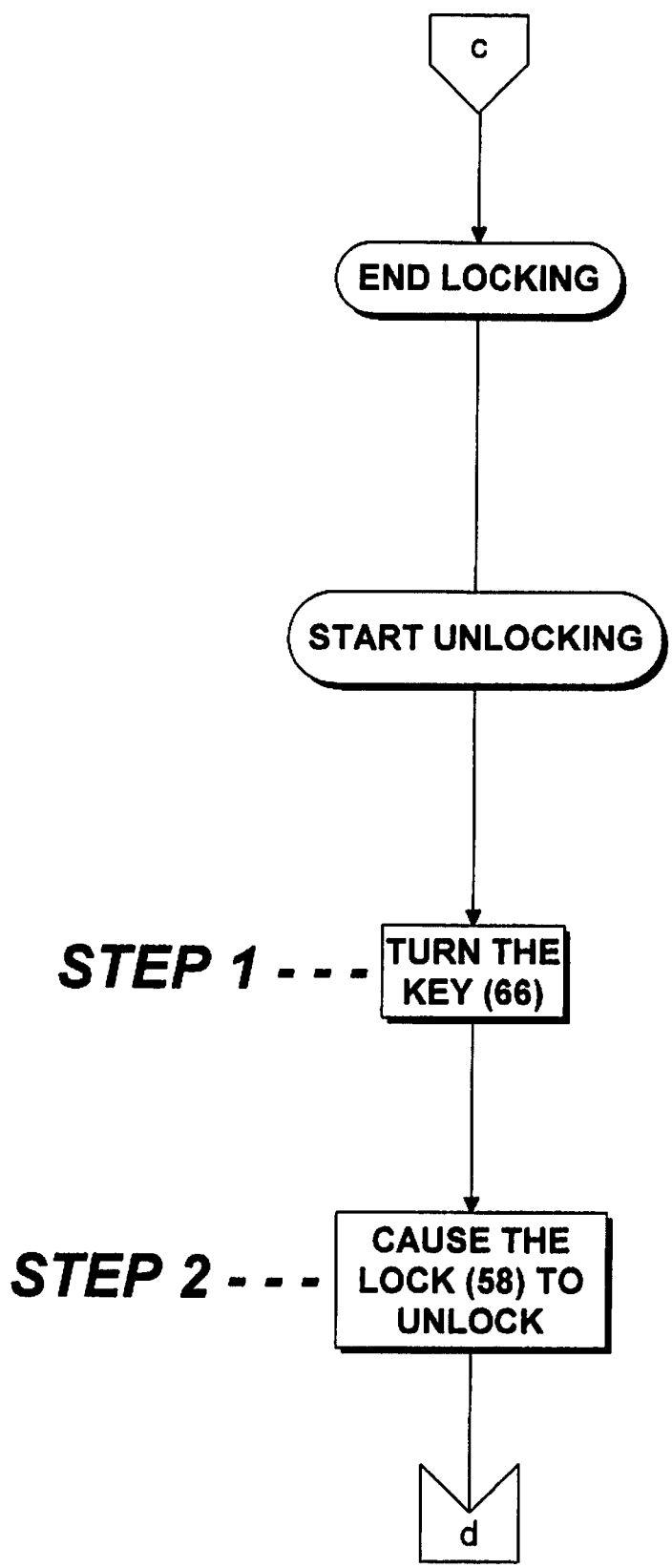
FIG. 9-D

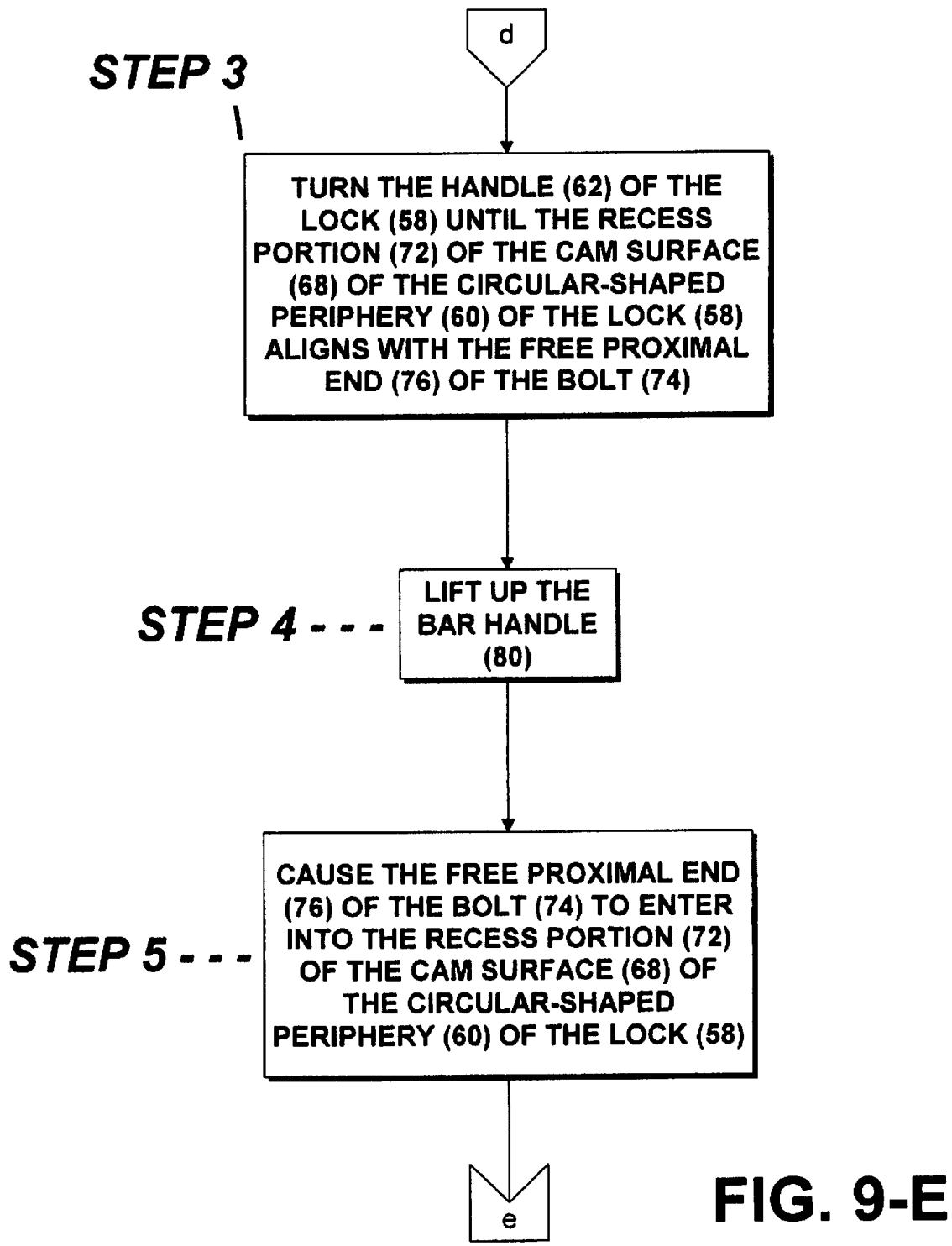
FIG. 9-E

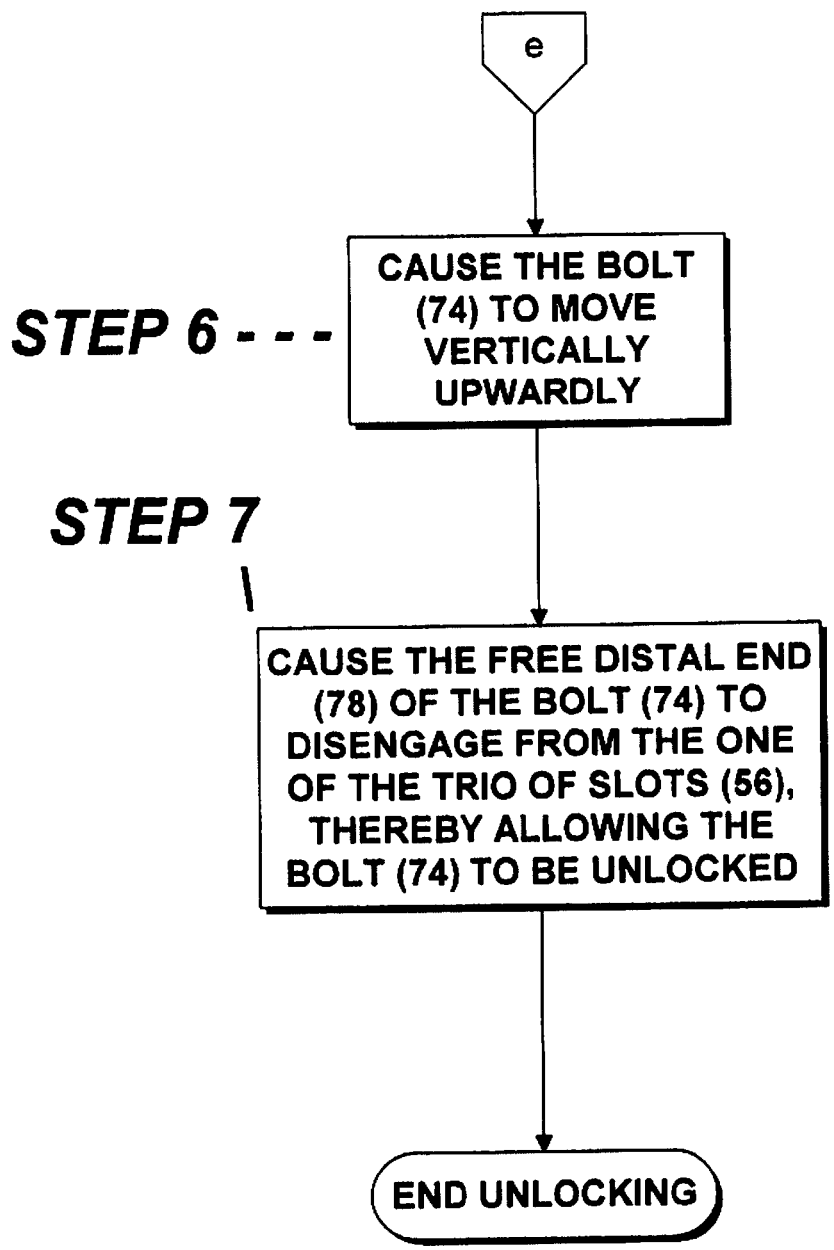
FIG. 9-F

TAILGATE TRUCK BED EXTENSION

BACKGROUND OF THE INVENTION

Field of the Invention

The present invention relates to a tailgate truck bed, and more particularly, a tailgate truck bed extension.

Description of the Prior Art

Numerous innovations for truck bed extenders have been provided in the prior art that will be described. Even though these innovations may be suitable for the specific individual purposes to which they address, however, they differ from the present invention.

A FIRST EXAMPLE, U.S. Pat. No. 2,852,303, Issued on Sep. 16, 1958, to Hopson teaches a vehicle including a support member having a horizontally disposed floor and vertically disposed, spaced, and parallel side members, horizontally disposed bars mounted on the floor, a plurality of spaced, parallel, horizontally disposed, and channel-shaped tracks mounted on the bars and arranged at right angles to the bars, and a movable and U-shaped body member adjustably connected to the support member. The body member includes a horizontally disposed bottom wall and spaced, parallel, and vertically disposed side walls. Further included are channel-shaped rails secured to the lower surface of the bottom wall. The rails register with the tracks. Still further included are trucks connected to the rails, and include wheels engaging the tracks, and brackets secured to the inner surfaces of the side members. The brackets include offset portions engaging the upper edges of the side walls. The upper portions of the side walls have a plurality of spaced-apart openings. Yet further included are securing elements extending through the brackets for selectively engaging the openings, and an angle bar secured to the bottom wall of the body member, a tailgate hingedly connected to the angle bar, a shaft mounted in the upper portion of the tailgate, a roller rotatably mounted on the shaft, and tail lights and a bumper connected to the movable body member.

A SECOND EXAMPLE, U.S. Pat. No. 3,245,714, Issued on Apr. 12, 1966, to Blair teaches a rectangular vehicle bed having a front and a rear end, which includes a frame having a pair of spaced-apart and longitudinally extending side members forming oppositely disposed pockets opening toward each other, transversely extending and transversely abutting floor boards having the opposite ends thereof slidably engaged, respectively, in the pockets forming a floor, an abutment at one end of the bed and engaging one of the boards preventing movement of the boards therepast longitudinally of the bed, and a transverse apparatus at the other end of the bed and engaging one of the boards preventing movement of the boards therepast longitudinally of the bed. Further included is an apparatus moveable longitudinally of the bed, engaging the transverse apparatus, and engaged with the frame for compressing the boards together longitudinally of the bed.

A THIRD EXAMPLE, U.S. Pat. No. 5,669,654, Issued on Sep. 23, 1997, to Eilers, et al. teaches a selectively extendable tailgate section for a cargo bed of a pick-up truck. The tailgate section is telescopically extended from the main body of the cargo bed to expand the cargo area as necessary. The telescoping tailgate section carries the flip-down gate and the tail lights of the vehicle keeping these features intact, regardless of the expanded position of the tailgate section. The telescoping tailgate section includes side walls and a bottom that are telescopically received within the fixed sides and bottom of the cargo bed. Rails support the expanded bed and are supported by a plurality of rollers for easy movement of the tailgate section. Additional structure support is added to the tailgate section for improved structural capacity.

A FOURTH EXAMPLE, U.S. Pat. No. 5,820,188, Issued on Oct. 13, 1998, to Nash teaches a truck bed extender having a pair of generally parallel and spaced-apart side walls that are joined to a back wall, and having an open top and an open bottom. A pair of forwardly pointing plates or tabs are coupled to the side walls. The forwardly pointing plates are generally structured and configured to slidably engage slots defined by the strike plates and the truck bed walls of a pickup truck. A pair of downwardly pointing plates or tabs, each including an opening for a latch bolt, are also coupled to the side walls. The downwardly pointing plates are structured and configured to slidably engage the slots defined by the latch plates and sides of the tail gate of a pickup truck.

A FIFTH EXAMPLE, U.S. Pat. No. 5,934,725, Issued on Aug. 10, 1999, to Bowers teaches an extendable load bearing apparatus that protects the bed of a pickup truck from damage caused by unloading and loading objects into and out of the bed, and that protects the bed from otherwise compromising weather-related elements. The apparatus includes a load-bearing tray that has longitudinal sides, a forward end, and a rear end, and that has downwardly projecting tray supports extending substantially along the longitudinal sides of the tray. The apparatus also includes a plurality of rollers, each housed within a roller bracket and secured to a workpiece. Each of the plurality of rollers is in supporting relationship with one of the pair of downwardly extending tray supports. At least one axle extends transversely from each of the pair of downwardly extending tray supports. A wheel is mounted in rotatable relationship to each of the axles to facilitate movement of the load bearing tray in a longitudinal direction. A pair of channel brackets is secured to the workpiece, with each of the wheels being housed within one of the channeled brackets to limit movement of the load bearing sliding tray in a longitudinal direction. The rollers and the wheels function as load bearing members that support the sliding tray to maximize the load bearing capability of the sliding tray, regardless of the position of the tray in relation to the pair of channel brackets.

A SIXTH EXAMPLE, U.S. Pat. No. 6,155,622, Issued on Dec. 5, 2000, to Reed teaches a truck bed extension for extending the useful length of a pickup truck bed. The truck bed extension includes a pair of transversely spaced sidewalls interconnected by a spacing member, with each sidewall coupled to a downwardly extending mount having an inwardly oriented pin, whereby the pins are substantially opposed and collinear. The pins are positioned for receipt into openings in the tailgate housing latches. When the truck bed extension is lowered, the pins are received into, and releasably coupled with, the latches. Brackets are, preferably, provided adjacent the forward margins of the sidewalls and oriented outwardly to receive inwardly extending posts extending inwardly from the bed walls.

A SEVENTH EXAMPLE, U.S. Pat. No. 6,422,630, Issued on Jul. 23, 2002, to Heaviside teaches a door mounted on the edge of a tailgate of a pickup truck, which is foldable against the inside surface of the tail gate when the tail gate is vertical or horizontal or is oriented away from the tailgate when the tailgate is horizontal thereby enclosing the bed of the truck when the tailgate is horizontal. The door effectively converts the truck bed from the standard six foot length to the standard eight foot length for carrying a stack of eight foot panels without having to tie down the panels or for carrying loose piles of material. The door panel is detachable when required.

AN EIGHTH EXAMPLE, U.S. Pat. No. 6,513,850, Issued on Feb. 4, 2003, to Reed teaches a truck bed extension for extending the useful length of a pickup truck bed. The truck bed extension includes a pair of transversely spaced sidewalls interconnected by a spacing member. The sidewalls, each have a forward margin and a lower margin. The forward margins have hardware mimicking that present on the pickup tailgate so as to permit the sidewalls to couple to the truck bed walls without the need for additional hardware. The lower margins have hardware mimicking that present on the truck bed walls so as to permit the sidewalls to couple to the tail gate without the need for additional hardware.

A NINTH EXAMPLE, U.S. Pat. No. 6,644,704, Issued on Nov. 11, 2003, to Nyberg teaches an expandable rack for a truck bed used to transport lumber and the like, which includes a plurality of folding legs rigidly connected to an upper frame that supports the lumber. The folding legs allow the upper frame to retract completely within the truck bed compartment so as not to protrude over the edge of the truck bed side walls when not in use. Further, the rack provides an unobstructed truck bed in that no portion of the expandable rack except the folding legs occupy space on the truck bed floor allowing the truck bed to be loaded without having to position the loaded materials over or around the rack. The rack deploys easily to allow a single person to easily convert the rack from a retracted position to a deployed position.

A TENTH EXAMPLE, U.S. Pat. No. 6,994,389, Issued on Feb. 7, 2006, to Graffy, et al. teaches a truck bed extender that is attached to a tail gate by mounting brackets. The mounting brackets attach to the tail gate only, and require absolutely no alterations to the truck bed. The truck bed extender is easily removed by removing two pins or is folded against the tail gate for minimum intrusion into the truck bed when the tail gate is closed. A telescoping back section is adjusted for various truck bed widths. Corners of the truck bed extender are squared off to maximize use of the extended truck bed.

AN ELEVENTH EXAMPLE, U.S. Pat. No. 7,506,909, Issued on Mar. 24, 2009, to Barnes teaches a truck bed assembly within which the width dimension of the bed's cargo space is selectively adjusted. The assembly includes laterally movable sidewalls that are constructed so as to widen the bed floor surface as they are moved outward as well as a laterally expandable tailgate that lengthens and shortens as the sidewalls are laterally expanded and retracted.

It is apparent now that numerous innovations for truck bed extenders have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a tailgate truck bed extension that avoids the disadvantages of the prior art.

ANOTHER OBJECT of the present invention is to provide a tailgate truck bed extension that is simple and inexpensive to manufacture.

STILL ANOTHER OBJECT of the present invention is to provide a tailgate truck bed extension that is simple to use.

BRIEFLY STATED, STILL YET ANOTHER OBJECT of the present invention is to provide an add-on extender for a pickup truck having a bed, a trailer lighting plug, and a tailgate with a pair of sides, a top, and a normal pivoting operation. The add-on extender permanently mounts onto the tailgate of the pickup truck so as not to have to be removed when not in use. The add-on extender does not interfere with the normal pivoting operation of the tailgate of the pickup truck, selectively extends the bed of the pickup truck, and selectively extends the tailgate of the pickup truck. The add-on extender includes a pair of side panels and a rear panel. The pair of side panels pivotally attach to the pair of sides of the tailgate, respectively, so as to have a non-operational folded position and an operational unfolded position that extends the bed of the pickup truck. The rear panel pivotally attaches to the top of the tailgate of the pickup truck so as to have a non-operational folded position and an operational unfolded position that extends the bed of the pickup truck and extends the tailgate of the pickup truck.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 5 is an elevational view, taken in the direction arrows 5 in FIGS. 1 and 2, of an end panel of the tailgate truck bed extension;

FIG. 6 is an elevational view, taken in the direction arrow 6 in FIG. 3, of the end panel of the tailgate truck bed extension;

FIGS. 9-A to 9-F are a flowchart of the method of locking and unlocking the tailgate truck bed extension.

A MARSHALING OF REFERENCE NUMERALS UTILIZED IN THE DRAWING

Figure 1:
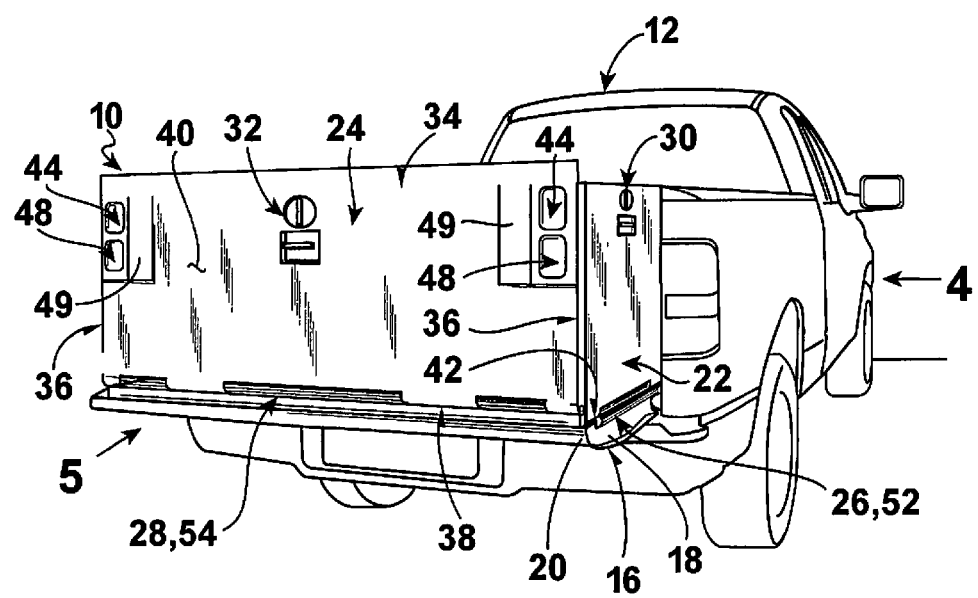
FIG. 1 is a diagrammatic perspective view of a truck with the tail gate opened and an embodiment of the tailgate truck bed extension installed thereon so as to increase the enclosed storage compartment size of the truck.

Introductory 10 add-on extender of embodiments of present invention for pickup truck 12 having bed 14, a trailer lighting plug, and tailgate 16 with pair of sides 18, top 20, and normal pivoting operation, for permanently mounting on tailgate 16 of pickup truck 12 so as not to have to be removed when not in use, for not interfering with normal pivoting operation of tailgate 16 of pickup truck 12, for selectively extending bed 14 of pickup truck 12, and for selectively extending tailgate 16 of pickup truck 12
12 pickup truck
14 bed of pickup truck 12
16 tailgate of pickup truck 12
18 pair of sides of tailgate 16 of pickup truck 12
20 top of tailgate 16 of pickup truck 12

Configuration of Add-on Extender 10

22 pair of side panels for pivotally attaching to pair of sides 18 of tailgate 16 of pickup truck 12, respectively, so as to have non-operational folded position and operational unfolded position for extending bed 14 of pickup truck 12
24 rear panel for pivotally attaching to top 20 of tailgate 16 of pickup truck 12 so as to have non-operational folded position and operational unfolded position for extending bed 14 of pickup truck 12 and for extending tailgate 16 of pickup truck 12
26 pair of side hinges for pivotally attaching to pair of sides 18 of tailgate 16 of pickup truck 12 for pivotally attaching pair of side panels 22 to pair of sides 18 of tailgate 16 of pickup truck 12, respectively
28 top hinge for pivotally attaching to top 20 of tailgate 16 of pickup truck 12 for pivotally attaching rear panel 24 to top 20 of tailgate 16 of pickup truck 12
30 pair of side hinge locks
32 top hinge lock
34 top of rear panel 24
36 pair of sides of rear panel 24
38 bottom of rear panel 24
40 outwardly-facing rear surface of rear panel 24
42 bottoms of pair of side panels 22, respectively
44 first pair of tail/brake lights for plugging into existing trailer lighting plug of pickup truck 12
46 second pair of tail/brake lights for plugging into existing trailer lighting plug of pickup truck 12
48 first pair of backup lights for plugging into existing trailer lighting plug of pickup truck 12
49 sliding/pivoting cover
50 second pair of backup lights for plugging into existing trailer lighting plug of pickup truck 12
52 pair of side concentric tubes of each side hinge of pair of side hinges 26
54 pair of rear concentric tubes of top hinge 28

Specific Configurations of Pair of Side Hinge Locks 30 and Top Hinge Lock 32

56 trio of slots of each other side tube of pair of side tubes 52 and of each side hinge of pair of side hinges 26
58 lock of each side hinge lock of pair of side hinge locks 30 and top hinge lock 32 for operating by key 66
60 circular-shaped periphery of lock 58 of each side hinge lock of pair of side hinge locks 30 and top hinge lock 32
62 cylinder of lock 58 of each side hinge lock of pair of side hinge locks 30 and top hinge lock 32
64 handle of lock 58 of each side hinge lock of pair of side hinge locks 30 and top hinge lock 32
66 key of lock 58 of each side hinge lock of pair of side hinge locks 30 and top hinge lock 32
68 cam surface of circular-shaped periphery 60 of lock 58 of each side hinge lock of pair of side hinge locks 30 and top hinge lock 32
70 ramp portion of cam surface 68 of circular-shaped periphery 60 of lock 58 of each side hinge lock of pair of side hinge locks 30 and top hinge lock 32
72 recess portion of cam surface 68 of circular-shaped periphery 60 of lock 58 of each side hinge lock of pair of side hinge locks 30 and top hinge lock 32
74 bolt of each side hinge lock of pair of side hinge locks 30 and top hinge lock 32
76 free proximal end of bolt 74 of each side hinge lock of pair of side hinge locks 30 and top hinge lock 32
78 free distal end of bolt 74 of each side hinge lock of pair of side hinge locks 30 and top hinge lock 32
80 bar handle of each side hinge lock of pair of side hinge locks 30 and top hinge lock 32
82 recesses in pair of side panels 22 and rear panel 24, respectively
84 lower coil spring of each side hinge lock of pair of side hinge locks 30 and top hinge lock 32
86 upper coil spring of each side hinge lock of pair of side hinge locks 30 and top hinge lock 32

DETAILED DESCRIPTION OF THE PREFERRED EMBODIMENTS

Introductory

Figure 2:
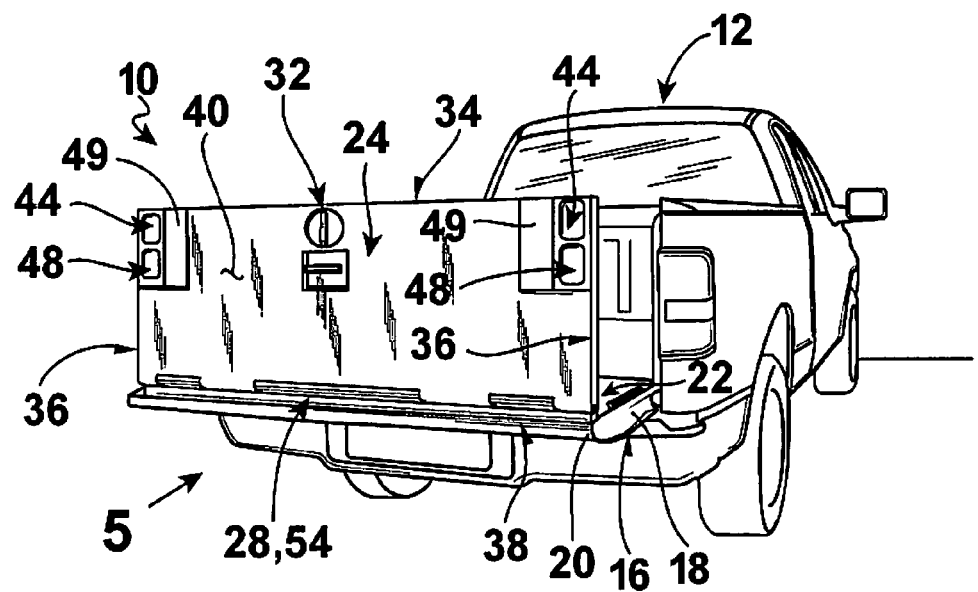
FIG. 2 is a diagrammatic perspective view of a truck with the tail gate opened and an embodiment of the tailgate truck bed extension installed thereon having the side panels folded down and just the end panel extended vertically.
Figure 3:
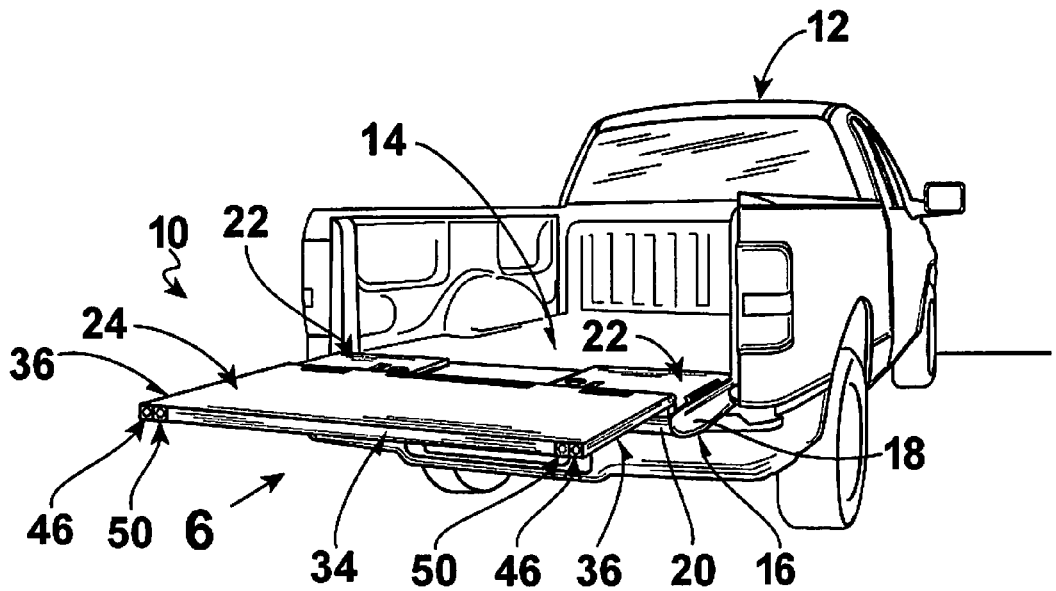
FIG. 3 is a diagrammatic perspective view of a truck with the tail gate opened and an embodiment of the tailgate truck bed extension installed thereon having the side panels folded down and just the end panel extended horizontally.
Figure 4:
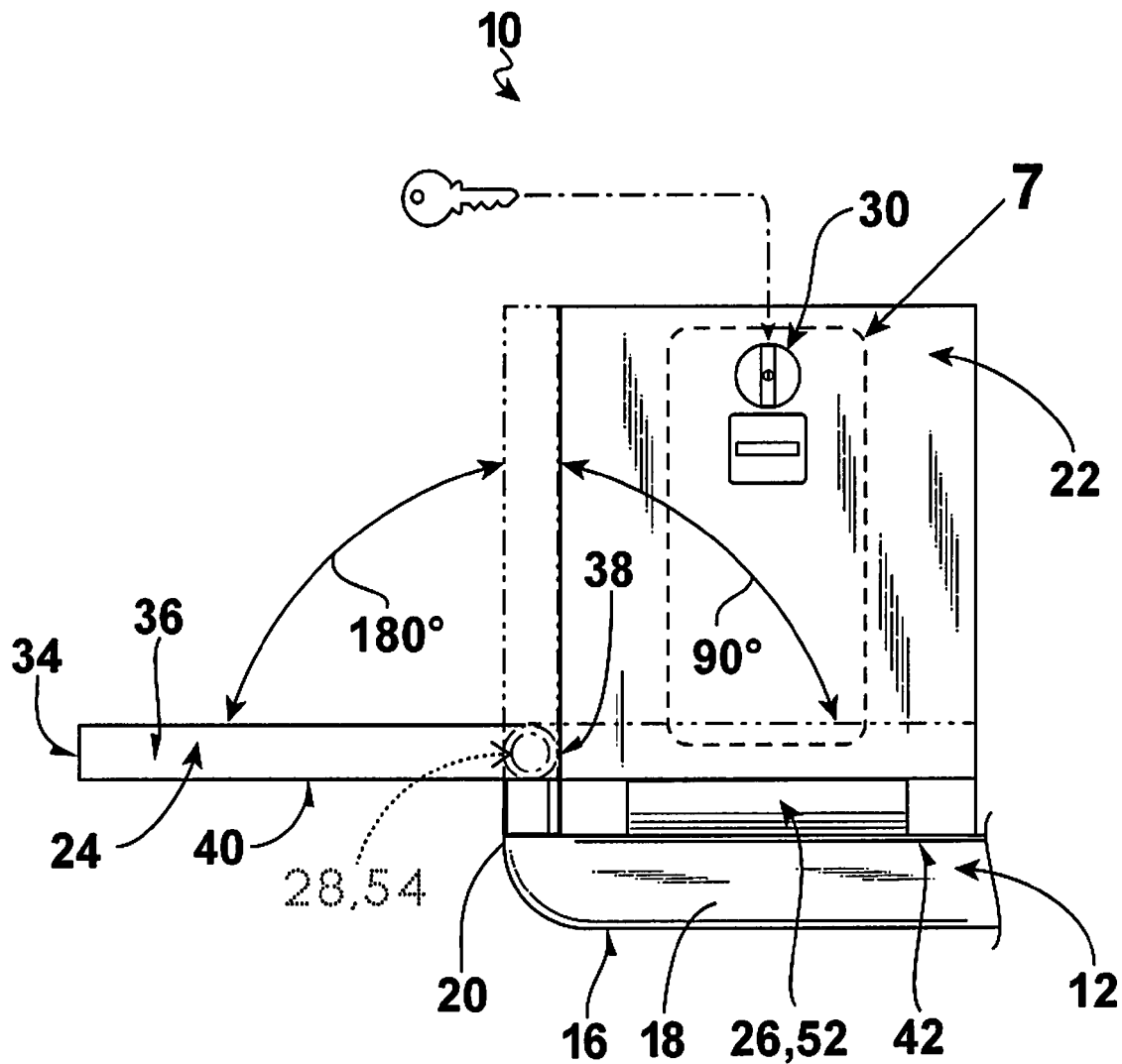
FIG. 4 is an elevational view with parts broken away, taken in the direction arrow 4 in FIG. 1, of the tailgate truck bed extension installed on a truck bed having the side panels extending upwards and the end panel shown extended fully outward to form a second tailgate, with two alternate possible positions for the end panel shown in phantom lines.

Referring now to the figures, in which like numerals indicate like parts, and particularly to FIGS. 1-3, the add-on extender of the embodiments of the present invention is shown generally at 10 for a pickup truck 12 having a bed 14, a trailer lighting plug, a tailgate 16 with a pair of sides 18, a top 20, and a normal pivoting operation, for permanently mounting on the tailgate 16 of the pickup truck 12 so as not to have to be removed when not in use, for not interfering with the normal pivoting operation of the tailgate 16 of the pickup truck 12, for selectively extending the bed 14 of the pickup truck 12, and for selectively extending the tailgate 16 of the pickup truck 12.

Overall Configuration of the Add-on Extender 10

The overall configuration of the add-on extender 10 can best be seen in FIGS. 1-6, and as such, will be discussed with reference thereto.

The add-on extender 10 comprises a pair of side panels 22 and a rear panel 24. The pair of side panels 22 are for pivotally attaching to the pair of sides 18 of the tailgate 16 of the pickup truck 12, respectively, so as to have a non-operational folded position and an operational unfolded position for extending the bed 14 of the pickup truck 12. The rear panel 24 is for pivotally attaching to the top 20 of the tailgate 16 of the pickup truck 12 so as to have a non-operational folded position and an operational unfolded position for extending the bed 14 of the pickup truck 12 and for extending the tailgate 16 of the pickup truck 12.

The add-on extender 10 further comprises a pair of side hinges 26.

The pair of side hinges 26 are pivotally attached to the pair of side panels 22, respectively, and are for pivotally attaching to the pair of sides 18 of the tailgate 16 of the pickup truck 12, respectively, for pivotally attaching the pair of side panels 22 to the pair of sides 18 of the tailgate 16 of the pickup truck 12, respectively.

The add-on extender 10 further comprises a top hinge 28.

The top hinge 28 is pivotally attached to the rear panel 24, and is for pivotally attaching to the top 20 of the tailgate 16 of the pickup truck 12 for pivotally attaching the rear panel 24 to the top 20 of the tailgate 16 of the pickup truck 12.

The add-on extender 10 further comprises a pair of side hinge locks 30. The pair of side hinge locks 30 have locked positions and unlocked positions.

The pair of side hinge locks 30 are disposed on the pair of side panels 22, respectively, are operatively connected to the pair of side hinges 26, respectively, when in the locked positions thereof, maintain the pair side panels 22 in both the operational unfolded position thereof of 90° upright and 180° outward and the non-operational folded position thereof of 0° flat, and when in the unlocked positions thereof, allow the pair of side panels 22 to transition between the operational unfolded position thereof and the non-operational folded position thereof.

The add-on extender 10 further comprises a top hinge lock 32. The top hinge 32 has a locked position and an unlocked position.

The top hinge lock 32 is disposed on the rear panel 24, is operatively connected to the top hinge 28, and when in the locked position thereof, maintains the rear panels 24 in both the operational unfolded position thereof of 90° upright and 180° outward and the non-operational folded position thereof of 0° flat, and when in the unlocked position thereof, allows the rear panel 24 to transition between the operational unfolded position thereof and the non-operational folded position thereof.

The rear panel 24 has a top 34, a pair of sides 36, a bottom 38, and an outwardly-facing rear surface 40.

The pair of side panels 22 have bottoms 42, respectively.

The add-on extender 10 further comprises a first pair of tail/brake lights 44. The first pair of tail/brake lights 44 are for plugging into the trailer lighting plug of the pickup truck 12.

The first pair of tail/brake lights 44 are disposed on the outwardly-facing rear surface 40 of the rear panel 24, at corners where the top 34 of the rear panel 24 meets the pair of sides 36 of the rear panel 24, respectively, and are used when the rear panel 24 is unfolded 90° upright.

The add-on extender 10 further comprises a second pair of tail/brake lights 46. The second pair of tail/brake lights 46 are for plugging into the trailer lighting plug of the pickup truck 12.

The second pair of tail/brake lights 46 are disposed on the top 34, adjacent the pair of sides 36 of the rear panel 24, respectively, (FIG. 3), and are used when the rear panel 24 is unfolded 180° outward.

The add-on extender 10 further comprises a first pair of backup lights 48. The first pair of backup lights 48 are for plugging into the trailer lighting plug of the pickup truck 12.

The first pair of backup lights 48 are used when the rear panel 24 is unfolded 90° upright, are disposed on the outwardly-facing rear surface 40 of the rear panel 24, adjacent to the first pair of tail/brake lights 44, respectively, and together with the first pair of tail/brake lights 44 are protected by a pair of sliding/pivoting covers 49, respectively.

The add-on extender 10 further comprises a second pair of backup lights 50. The second pair of backup lights 50 are for plugging into the trailer lighting plug of the pickup truck 12.

The second pair of backup lights 50 are disposed on the top 34 of the rear panel 24, adjacent to the second pair of tail/brake lights 46, respectively, (FIG. 3), and are used when the rear panel 24 is unfolded 180° outward.

The first pair of tail/brake lights 44, the second pair of tail/brake lights 46, the first pair of backup lights 48, and the second pair 50 of backup lights 50 are together in a pair of integral corner assemblies, respectively, for ease of replacement and for better waterproofing as a result of no separations between associated ones of the first pair of tail/brake lights 44, the second pair of tail/brake lights 46, the first pair of backup lights 48, and the second pair 50 of backup lights 50.

Each side hinge 26 includes a pair of side concentric tubes 52.

The pair of side concentric tubes 52 of each side hinge 26 pivot relative to each other.

One side tube 52 of each side hinge 26 is affixed to the bottoms 42 of the pair of side panels 22, respectively, while the other side tube 52 of each side hinge 26 has a center and is for affixing to the pair of sides 18 of the tailgate 16 of the pickup truck 12, respectively, so as to allow the pair of side panels 26 to pivot between 0° flat on the tailgate 16 of the pickup truck 12 in the non-operational positions thereof, 90° upright from the tailgate 16 of the pickup truck 12 to the operational positions thereof, and 180° outward from the tailgate 16 of the pickup truck 12 to the operational positions thereof.

The top hinge 28 includes a pair of rear concentric tubes 54.

The pair of rear concentric tubes 54 of the top hinge 28 pivot relative to each other.

One rear tube 54 of the top hinge 28 is affixed to the bottom 38 of the rear panel 24, while the other rear tube 54 of the top hinge 28 has a center and is for affixing to the top 20 of the tailgate 16 of the pickup truck 12, so as to allow the rear panel 24 to pivot between 0° flat onto the pair of side panels 22 in the non-operational position thereof, 90° upright from the tailgate 16 of the pickup truck 12 to the operational position thereof, and 180° outward from the tailgate 16 of the pickup truck 12 to the operational position thereof.

Specific Configurations of the Pair of Side Hinge Locks 30 and the Top Hinge Lock 32

Figure 7:
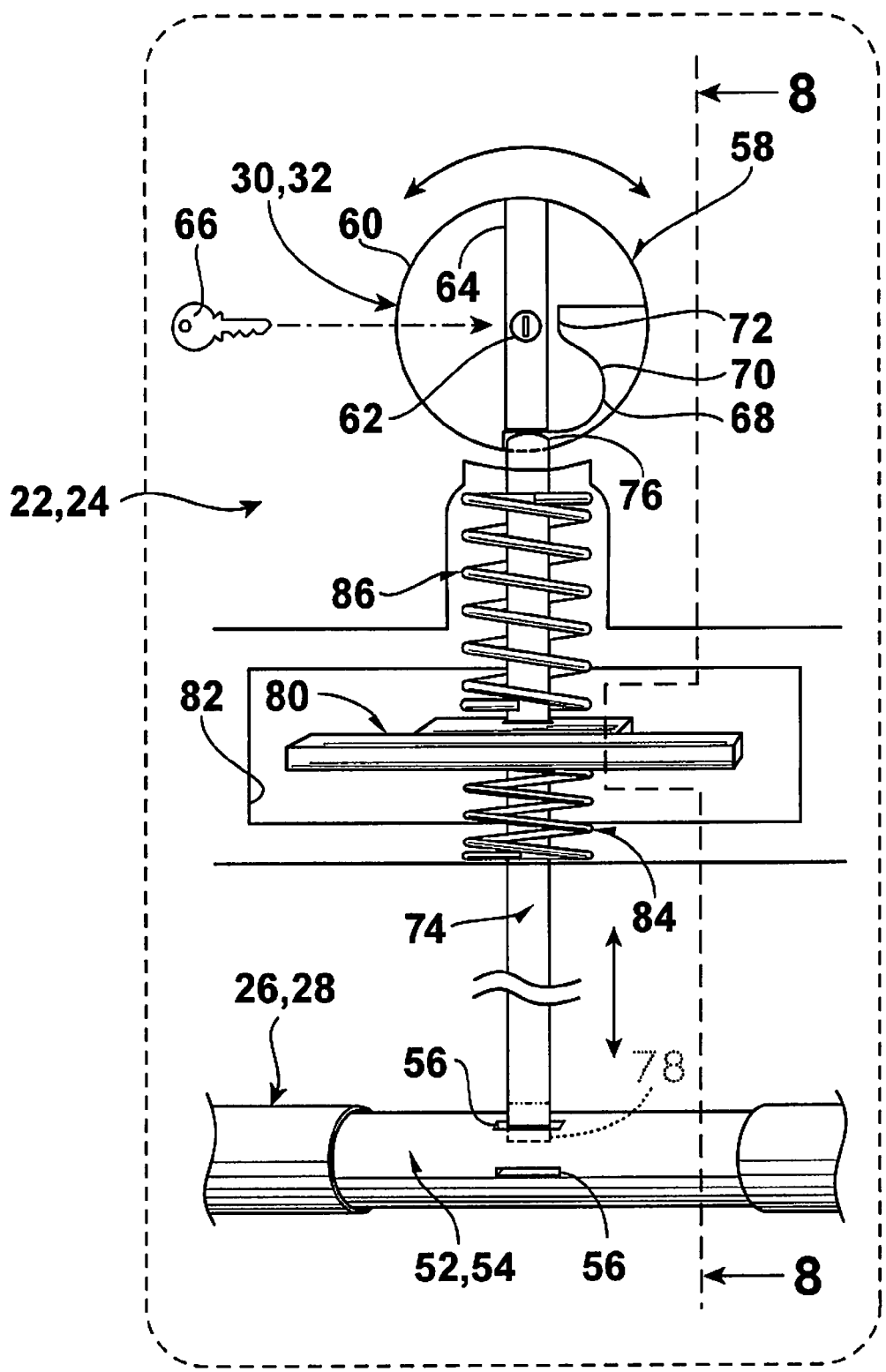
FIG. 7 is a diagrammatic view, with parts broken away, of the locking mechanism hidden under the surface enclosed in the dotted curve indicated by arrows 7 in FIGS. 4 and 5.
Figure 8:
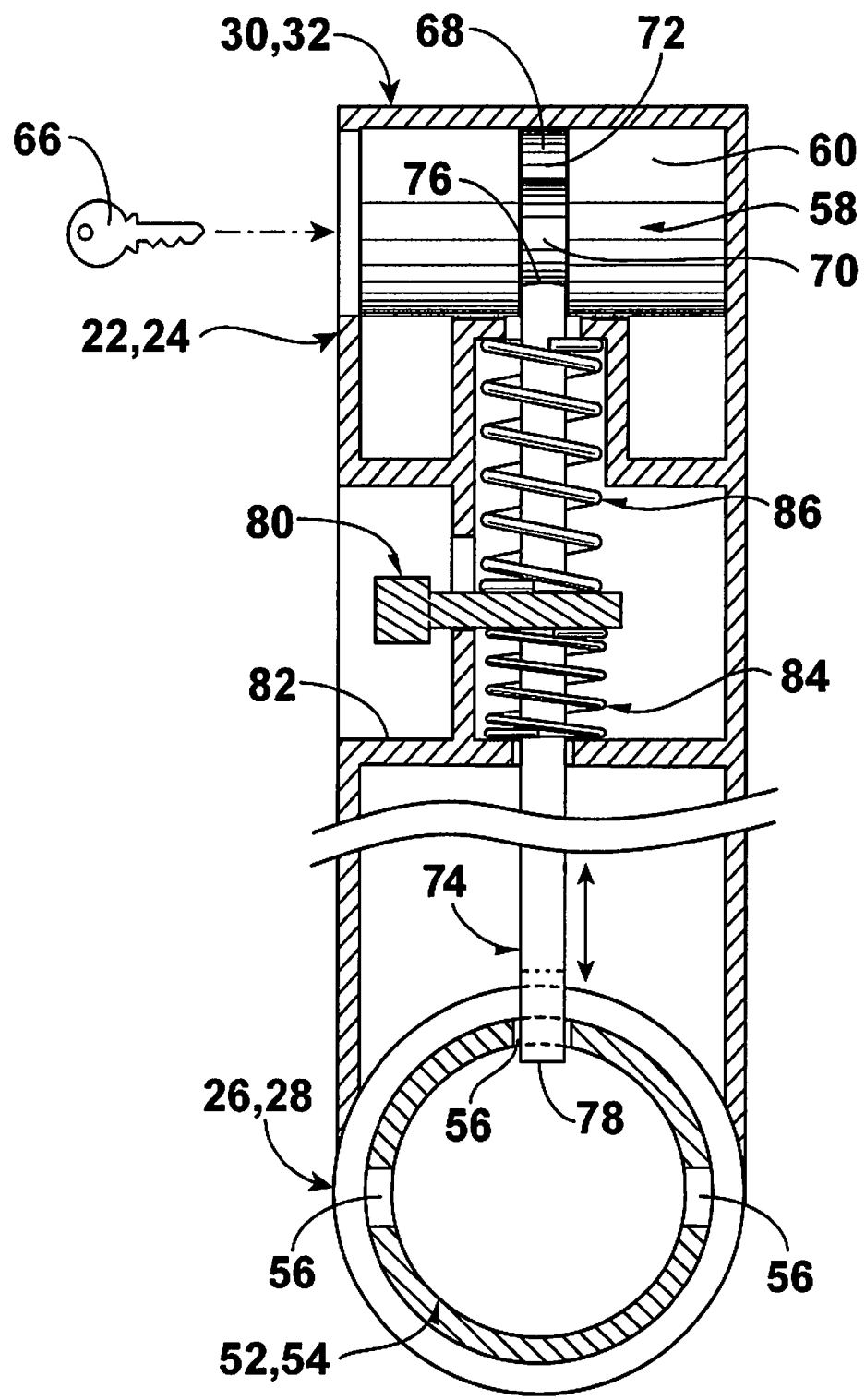
FIG. 8 is a cross sectional view, with parts broken away, taken on cut 8-8 in FIG. 7.

The specific configurations of the pair of side hinge locks 30 and the top hinge lock 32 can best be seen in FIGS. 7 and 8, and as such, will be discussed with reference thereto.

The pair of side hinge locks 30 and the top hinge lock 32 are identical to each other, and have locked positions and unlocked positions.

Each of the pair of side hinge locks 30 and the top hinge lock 32 comprises the other side tube 52 of each side hinge 26 and the other rear tube 54 of the top hinge 28 having a trio of slots 56.

The trio of slots 56 of the other side tube 52 of each side hinge 26 and the other rear tube 54 of the top hinge 28 are axially oriented, are circumferentially spaced-apart 90° from each other, are disposed at the centers of the pair of side concentric tubes 52 of each side hinge 26, respectively, and are disposed at the centers of the pair of rear concentric tubes 54 of the top hinge 28.

Each of the pair of side hinge locks 30 and the top hinge lock 32 further comprises a lock 58.

The lock 58 of each of the pair of side hinge locks 30 and the top hinge lock 32 is accessible from the pair of side panels 22 and the rear panel 24, respectively.

The lock 58 of each of the pair of side hinge locks 30 and the top hinge lock 32 has a circular-shaped periphery 60, a cylinder 62, a handle 64 accessible from the pair of side panels 22 and the rear panel 24, respectively, and is for operating by a key 66.

The circular-shaped periphery 60 of the lock 58 of each of the pair of side hinge locks 30 and the top hinge lock 32 has a cam surface 68 with a ramp portion 70 flowing into a recess portion 72.

Each of the pair of side hinge locks 30 and the top hinge lock 32 further comprises a bolt 74.

The bolt 74 of each of the pair of side hinge locks 30 and the top hinge lock 32 is vertically oriented, and has a free proximal end 76 and a free distal end 78.

The free proximal end 76 of the bolt 74 of each of the pair of side hinge locks 30 and the top hinge lock 32 is rounded and contacts the ramp portion 70 of the cam surface 68 of the circular-shaped periphery 60 of the lock 58 of an associated one of the pair of side hinge locks 30 and the top hinge lock 32 when the associated one of the pair of side hinge locks 30 and the top hinge lock 32 is in the locked position thereof and enters in the recess portion 72 of the cam surface 68 of the circular-shaped periphery 60 of the lock 58 of the associated one of the pair of side hinge locks 30 and the top hinge lock 32 when the associated one of the pair of side hinge locks 30 and the top hinge lock 32 are in the unlocked position thereof.

The distal end 78 of the bolt 74 of each of the pair of side hinge locks 30 and the top hinge lock 32 is flattened to engage into one of the trio of slots 56 of the other side/rear tube 52, 54 of an associated one of the pair of side hinges 26 and the top hinge 28 when the associated one of the pair of side hinge locks 30 and the top hinge lock 32 is in the locked position thereof, and engages into another of the trio of slots 56 of the other side tube 52, 54 of the associated one of the pair of side hinges 26 and the top hinge 28 when the associated one of the pair of side hinge locks 30 and the top hinge lock 32 is in the unlocked position thereof.

Each of the pair of side hinge locks 30 and the top hinge lock 32 further comprises a bar handle 80.

The bar handle 80 of each of the pair of side hinge locks 30 and the top hinge lock 32 is unobtrusively accessible from within recesses 82 in the pair of side panels 22 and the rear panel 24, respectively, and is disposed below the lock 58 of an associated one of the pair of side hinge locks 30 and the top hinge lock 32.

The bar handle 80 of each of the pair of side hinge locks 30 and the top hinge lock 32 is horizontally oriented, and extends perpendicularly, fixedly, and equally outwardly from both sides of the bolt 74 of an associated one of the pair of side hinge locks 30 and the top hinge lock 32.

Each of the pair of side hinge locks 30 and the top hinge lock 32 further comprises a lower coil spring 84.

The lower coil spring 84 of each of the pair of side hinge locks 30 and the top hinge lock 32 is disposed around, i.e., coils over, the bolt 74 of an associated one of the pair of side hinge locks 30 and the top hinge lock 32, below, and pressing against, the bar handle 80 of the associated one of the pair of side hinge locks 30 and the top hinge lock 32.

Each of the pair of side hinge locks 30 and the top hinge lock 32 further comprises an upper coil spring 86.

The upper coil spring 86 of each of the pair of side hinge locks 30 and the top hinge lock 32 is disposed around, i.e., coils over, the bolt 74 of an associated one of the pair of side hinge locks 30 and the top hinge lock 32, above, and pressing against, the bar handle 80 of the associated one of the pair of side hinge locks 30 and the top hinge lock 32.

Method of Locking and Unlocking Each of the Pair of Side Hinge Locks 30 and the Top Hinge Lock 32

The method of locking and unlocking each of the pair of side hinge locks 30 and the top hinge lock 32 can best be seen in FIGS. 9-A to 9-F, and as such, will be discussed with reference thereto.

Locking

STEP 1: As shown in FIG. 9-A, press down on the bar handle 80;
STEP 2: As further shown in FIG. 9-A, cause the bolt 74 to move vertically downwardly;
STEP 3: As shown in FIG. 9-B, cause the free distal end 78 of the bolt 74 to engage into one of the trio of slots 56;
STEP 4: As further shown in FIG. 9-B, turn the key 66;
STEP 5: As still further shown in FIG. 9-B, cause the lock 58 to unlock;
STEP 6: As shown in FIG. 9-C, turn the handle 62 of the lock 58 until the ramp portion 70 of the cam surface 68 of the circular-shaped periphery 60 of the lock 58 contacts the free proximal end 76 of the bolt 74;
STEP 7: As further shown in FIG. 9-C, turn the key 66; and
STEP 8: As still further shown in FIG. 9-C, cause the lock 58 to lock, thereby preventing the bolt 74 from being vertically lifted and unlocked.

Unlocking

STEP 1: As shown in FIG. 9-D, turn the key 66;
STEP 2: As further shown in FIG. 9-D, cause the lock 58 to unlock;
STEP 3: As shown in FIG. 9-E, turn the handle 62 of the lock 58 until the recess portion 72 of the cam surface 68 of the circular-shaped periphery 60 of the lock 58 aligns with the free proximal end 76 of the bolt 74;
STEP 4: As further shown in FIG. 9-E, lift up the bar handle 80;
STEP 5: As still further shown in FIG. 9-E, cause the free proximal end 76 of the bolt 74 to enter into the recess portion 72 of the cam surface 68 of the circular-shaped periphery 60 of the lock 58;
STEP 6: As shown in FIG. 9-F, cause the bolt 74 to move vertically upwardly; and
STEP 7: As further shown in FIG. 9-F, cause the free distal end 78 of the bolt 74 to disengage from the one of the trio of slots 56, thereby allowing the bolt 74 to be unlocked.

Impressions

It will be understood that each of the elements described above, or two or more together, may also find a useful application in other types of constructions differing from the types described above.

While the invention has been illustrated and described as embodiments of a tailgate truck bed extension, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An add-on extender for a pickup truck having a bed, a trailer lighting plug, and a tailgate with a pair of sides, a top, and a normal pivoting operation, for permanently mounting on the tailgate of the pickup truck so as not to have to be removed when not in use, for not interfering with the normal pivoting operation of the tailgate of the pickup truck, for selectively extending the bed of the pickup truck, and for selectively extending the tailgate of the pickup truck, said add-on extender comprising:
   a) a pair of side panels; and
   b) a rear panel;
   wherein said pair of side panels are for pivotally attaching to the pair of sides of the tailgate, respectively, so as to have a non-operational folded position and an operational unfolded position for extending the bed of the pickup truck; and
   wherein said rear panel is for pivotally attaching to the top of the tailgate of the pickup truck so as to have a non-operational folded position and an operational unfolded position for extending the bed of the pickup truck and for extending the tailgate of the pickup truck;
   further comprising a pair of side hinges;
   further comprising a top hinge;
   further comprising a pair of side hinge locks;
   wherein said pair of side hinge locks have locked positions, respectively; and
   wherein said pair of side hinge locks have unlocked positions, respectively.

2. The add-on extender of claim 1,
   wherein said pair of side hinges are pivotally attached to said pair of side panels, respectively; and
   wherein said pair of side hinges are for pivotally attaching to the pair of sides of the tailgate of the pickup truck, respectively, for pivotally attaching said pair of side panels to the pair of sides of the tailgate of the pickup truck.

3. The add-on extender of claim 1,
   wherein said top hinge is pivotally attached to said rear panel; and
   wherein said top hinge is for pivotally attaching to the top of the tailgate of the pickup truck for pivotally attaching said rear panel to the top of the tailgate of the pickup truck.

4. The add-on extender of claim 1, wherein said pair of side hinge locks are disposed on said pair of side panels, respectively.

5. The add-on extender of claim 1, wherein said pair of side hinge locks are operatively connected to said pair of side hinges, respectively.

6. The add-on extender of claim 1, wherein said pair of side hinge locks, when in said locked positions thereof, maintain said pair of side panels in both said operational unfolded position thereof of 90° upright and 180° outward and said non-operational folded position thereof of 0° flat, and when in said unlocked positions thereof, allow said pair of side panels to transition between said operational unfolded positions thereof and said non-operational folded positions thereof.

7. The add-on extender of claim 1, further comprising a top hinge lock;
   wherein said top hinge has a locked position; and
   wherein said top hinge has an unlocked position.

8. The add-on extender of claim 7, wherein said top hinge lock is disposed on said rear panel.

9. The add-on extender of claim 7, wherein said top hinge lock is operatively connected to said top hinge.

10. The add-on extender of claim 7, wherein said top hinge lock, when in said locked position thereof, maintains said rear panel in both said operational unfolded position thereof of 90° upright and 180° outward and said non-operational folded position thereof of 0° flat, and when in said unlocked position thereof, allows said rear panel to transition between said operational unfolded position thereof and said non-operational folded position thereof.

11. The add-on extender of claim 1, wherein said rear panel has a top.

12. The add-on extender of claim 11, wherein said rear panel has a pair of sides.

13. The add-on extender of claim 7, wherein said rear panel has a bottom.

14. The add-on extender of claim 12, wherein said rear panel has an outwardly-facing rear surface.

15. The add-on extender of claim 13, wherein said pair of side panels have bottoms, respectively.

16. The add-on extender of claim 14, further comprising a first pair of tail/brake lights; and
   wherein said first pair of tail/brake lights are for plugging into the trailer lighting plug of the pickup truck.

17. The add-on extender of claim 16, wherein said first pair of tail/brake lights are disposed on said outwardly-facing rear surface of said rear panel.

18. The add-on extender of claim 16, wherein said first pair of tail/brake lights are disposed at corners where said top of said rear panel meets said pair of sides of said rear panel, respectively.

19. The add-on extender of claim 16, wherein said first pair of tail/brake lights are used when said rear panel is unfolded 90° upright.

20. The add-on extender of claim 16, further comprising a second pair of tail/brake lights; and
   wherein said second pair of tail/brake lights are for plugging into the trailer lighting plug of the pickup truck.

21. The add-on extender of claim 20, wherein said second pair of tail/brake lights are disposed on said top of said rear panel.

22. The add-on extender of claim 20, wherein said second pair of tail/brake lights are disposed adjacent to said pair of sides of said rear panel, respectively.

23. The add-on extender of claim 20, wherein said second pair of tail/brake lights are used when said rear panel is unfolded 180° outward.

24. The add-on extender of claim 20, further comprising a first pair of backup lights; and
   wherein said first pair of backup lights are for plugging into the trailer lighting plug of the pickup truck.

25. The add-on extender of claim 24, wherein said first pair of backup lights are disposed on said outwardly-facing rear surface of said rear panel.

26. The add-on extender of claim 24, wherein said first pair of backup lights are disposed adjacent to said first pair of tail/brake lights, respectively.

27. The add-on extender of claim 24, wherein said first pair of backup lights are used when said rear panel is unfolded 90° upright.

28. The add-on extender of claim 24, further comprising a second pair of backup lights; and
wherein said second pair of backup lights are for plugging into the trailer lighting plug of the pickup truck.

29. The add-on extender of claim 28, wherein said second pair of backup lights are disposed on said top of said rear panel.

30. The add-on extender of claim 28, wherein said second pair of backup lights are disposed adjacent to said second pair of tail/brake lights, respectively.

31. The add-on extender of claim 28, wherein said second pair of backup lights are used when said rear panel is unfolded 180° outward.

32. The add-on extender of claim 15, wherein each side hinge includes a pair of side concentric tubes.

33. The add-on extender of claim 32, wherein said pair of side concentric tubes of each side hinge pivot relative to each other.

34. The add-on extender of claim 32, wherein one side tube of each side hinge is affixed to said bottoms of said pair of side panels, respectively, while the other side tube of an associated side hinge has a center and is for affixing to the pair of sides of the tailgate of the pickup truck, respectively, so as to allow said pair of side panels to pivot between 0° flat on the tailgate of the pickup truck in said non-operational position thereof, 90° upright from the tailgate of the pickup truck to said operational positions thereof, and 180° outward from the tailgate of the pickup truck to said operational position thereof.

35. The add-on extender of claim 34, wherein said top hinge includes a pair of rear concentric tubes.

36. The add-on extender of claim 35, wherein said pair of rear concentric tubes of said top hinge pivot relative to each other.

37. The add-on extender of claim 36, wherein one rear tube of said top hinge is affixed to the bottom of the rear panel, while the other rear tube of said top hinge has a center and is for affixing to the top of the tailgate of the pickup truck, so as to allow said rear panel to pivot between 0° flat onto said pair of side panels in the non-operational positions thereof, 90° upright from the tailgate of the pickup truck to the operational position thereof, and 180° outward from the tailgate of the pickup truck to the operational position thereof.

38. The add-on extender of claim 37, wherein said pair of side hinge locks and said top hinge lock are identical to each other;
wherein said pair of side hinge locks and said top hinge lock have locked positions, respectively; and
wherein said pair of side hinge locks and said top hinge lock have unlocked positions, respectively.

39. The add-on extender of claim 38, wherein each of said pair of side hinge locks and said top hinge lock comprises the other side tube of each of said pair of side hinges and the other rear tube of said top hinge having a trio of slots.

40. The add-on extender of claim 39, wherein said trio of slots of the other side tube of each of said pair of side hinges and the other rear tube of said top hinge are axially oriented.

41. The add-on extender of claim 39, wherein said trio of slots of the other side tube of each of said pair of side hinges and the other rear said top hinge are circumferentially spaced-apart 90° from each other.

42. The add-on extender of claim 39, wherein said trio of slots of the other side tube of each of said pair of side hinges and the other rear tube of said top hinge are disposed at said centers of said pair of side concentric tubes of each of said pair of side hinge and at said centers of said pair of rear concentric tubes of said top hinge.

43. The add-on extender of claim 39, wherein each of said pair of side hinge locks and said top hinge lock comprises a lock; and
wherein said lock of each of said pair of side hinge locks and said top hinge lock is for operating by a key.

44. The add-on extender of claim 43, wherein said lock of each of said pair of side hinge locks and said top hinge lock is accessible from said pair of side panels and said rear panel, respectively.

45. The add-on extender of claim 43, wherein said lock of each of said pair of side hinge locks and said top hinge lock has a circular-shaped periphery.

46. The add-on extender of claim 43, wherein said lock of each of said pair of side hinge locks and said top hinge lock has a cylinder.

47. The add-on extender of claim 43, wherein said lock of each of said pair of side hinge locks and said top hinge lock has a handle; and
wherein said handle of said lock of each of said pair of side hinge locks and said top hinge lock is accessible from said pair of side panels and said rear panel, respectively.

48. The add-on extender of claim 45, wherein said circular-shaped periphery of said lock of each of said pair of side hinge locks and said top hinge lock has a cam surface.

49. The add-on extender of claim 48, wherein said cam surface of said circular-shaped periphery of said lock of each of said pair of side hinge locks and said top hinge lock has a ramp portion.

50. The add-on extender of claim 49, wherein said cam surface of said circular-shaped periphery of said lock of each of said pair of side hinge locks and said top hinge lock has a recess portion.

51. The add-on extender of claim 50, wherein said ramp portion of said cam surface of said circular-shaped periphery of said lock of each of said pair of side hinge locks and said top hinge lock flows into said recess portion of said cam surface of said circular-shaped periphery of said lock of an associated one of said pair of side hinge locks and said top hinge lock.

52. The add-on extender of claim 49, wherein each of said pair of side hinge locks and said top hinge lock comprises a bolt.

53. The add-on extender of claim 52, wherein said bolt of each of said pair of side hinge locks and said top hinge lock is vertically oriented.

54. The add-on extender of claim 52, wherein said bolt of each of said pair of side hinge locks and said top hinge lock has a free proximal end.

55. The add-on extender of claim 52, wherein said bolt of each of said pair of side hinge locks and said top hinge lock has a free distal end.

56. The add-on extender of claim 54, wherein said free proximal end of said bolt of each of said pair of side hinge locks and said top hinge lock is rounded.

57. The add-on extender of claim 54, wherein said free proximal end of said bolt of each of said pair of side hinge locks and said top hinge lock contacts said ramp portion of said cam surface of said circular-shaped periphery of said lock of an associated one of said pair of side hinge locks and said top hinge lock when said associated one of said pair of side hinge locks and said top hinge lock is in said locked position thereof.

58. The add-on extender of claim 54, wherein said free proximal end of said bolt of each of said pair of side hinge locks and said top hinge lock engages in said recess portion of said circular-shaped periphery of said lock of an associated one of said pair of side hinge locks and said top hinge lock when the associated one of said pair of side hinge locks and said top hinge lock is in said unlocked position thereof.

59. The add-on extender of claim 55, wherein said distal end of said bolt of each of said pair of side hinge locks and said top hinge lock is flattened.

60. The add-on extender of claim 55, wherein said distal end of said bolt of each of said pair of side hinge locks and said top hinge lock engages into one of said trio of slots of the other side tube of an associated one of said pair of side hinges and said top hinge when said associated one of said pair of side hinge locks and said top hinge lock is in said locked position thereof.

61. The add-on extender of claim 55, wherein said distal end of said bolt of each of said pair of side hinge locks and said top hinge lock engages into another of said trio of slots of the other side tube of an associated one of said pair of side hinges and said top hinge when said associated one of said pair of side hinge locks and said top hinge lock are in said unlocked position thereof.

62. The add-on extender of claim 52, wherein each of said pair of side hinge locks and said top hinge lock comprises a bar handle.

63. The add-on extender of claim 62, wherein said bar handle of each of said pair of side hinge locks and said top hinge lock is unobtrusively accessible from within recesses in said pair of side panels and said rear panel, respectively.

64. The add-on extender of claim 62, wherein said bar handle of each of said pair of side hinge locks and said top hinge lock is disposed below said lock of an associated one of said pair of side hinge locks and said top hinge lock.

65. The add-on extender of claim 62, wherein said bar handle of each of said pair of side hinge locks and said top hinge lock is horizontally oriented.

66. The add-on extender of claim 62, wherein said bar handle of each of said pair of side hinge locks and said top hinge lock extends perpendicularly from said bolt of an associated one of said pair of side hinge locks and said top hinge lock.

67. The add-on extender of claim 62, wherein said bar handle of each of said pair of side hinge locks and said top hinge lock extends fixedly from both sides of said bolt of an associated one of said pair of side hinge locks and said top hinge lock.

68. The add-on extender of claim 62, wherein said bar handle of each of said pair of side hinge locks and said top hinge lock extends equally outwardly from both sides of said bolt of an associated one of said pair of side hinge locks and said top hinge lock.

69. The add-on extender of claim 62, wherein each of said pair of side hinge locks and said top hinge lock comprises a lower coil spring.

70. The add-on extender of claim 69, wherein said lower coil spring of each of said pair of side hinge locks and said top hinge lock is disposed around said bolt of an associated one of said pair of side hinge locks and said top hinge lock.

71. The add-on extender of claim 69, wherein said lower coil spring of each of said pair of side hinge locks and said top hinge lock is disposed below said bar handle of an associated one of said pair of side hinge locks and said top hinge lock.

72. The add-on extender of claim 69, wherein said lower coil spring of each of said pair of side hinge locks and said top hinge lock presses against said bar handle of an associated one of said pair of side hinge locks and said top hinge lock.

73. The add-on extender of claim 62, wherein each of said pair of side hinge locks and said top hinge lock comprises an upper coil spring.

74. The add-on extender of claim 73, wherein said upper coil spring of each of said pair of side hinge locks and said top hinge lock is disposed around said bolt of an associated one of said pair of side hinge locks and said top hinge lock.

75. The add-on extender of claim 73, wherein said upper coil spring of each of said pair of side hinge locks and said top hinge lock is disposed above said bar handle of an associated one of said pair of side hinge locks and said top hinge lock.

76. The add-on extender of claim 73, wherein said upper coil spring of each of said pair of side hinge locks and said top hinge lock presses against said bar handle of an associated one of said pair of side hinge locks and said top hinge lock.

77. The add-on extender of claim 28, wherein said first pair of tail/brake lights, said second pair of tail/brake lights, said first pair of backup lights, and said second pair of backup lights are together in a pair of integral corner assemblies, respectively;
    wherein said pair of integral corner assemblies are for ease of replacement; and
    wherein said pair of integral corner assemblies are for better waterproofing as a result of no separations between associated ones of said first pair of tail/brake lights, said second pair of tail/brake lights, said first pair of backup lights, and said second pair of backup lights.

78. A method of locking and unlocking a pair of side hinge locks of an add-on bed and tailgate extender of a pickup truck and a top hinge lock of the add-on bed and tailgate extender of the pickup truck;
    wherein the add-on bed and tailgate extender further has:
    a) a bar handle; and
    b) a bolt having:
        i) a free proximal end; and
        ii) a free distal end;
    wherein each of the pair of side hinge locks and the top hinge lock has:
    a) a pair of concentric tubes; and
    b) a lock having:
        i) a key;
        ii) a handle; and
        iii) a circular-shaped periphery having a cam surface with:
            1) a ramp portion; and
            2) a recess surface;
    wherein each concentric tube of each of the pair of side hinge locks and the top hinge lock has a trio of slots; and
    wherein said method comprising the steps of:
    a) pressing down on the bar handle;
    b) causing the bolt to move vertically downwardly;
    c) causing the free distal end of the bolt to engage into one of the trio of slots;
    d) turning the key;
    e) causing the lock to unlock;
    f) turning the handle of the lock until the ramp surface of the cam portion of the circular-shaped periphery of the lock contacts the free proximal end of the bolt;
    g) turning the key;

h) causing the lock to lock, thereby preventing the bolt from being vertically lifted and unlocked;
i) turning the key;
j) causing the lock to unlock;
k) turning the handle of the lock until the recess portion of the cam surface of the circular-shaped periphery of the lock aligns with the free proximal end of the bolt;
l) lifting up the bar handle;
m) causing the free proximal end of the bolt to enter into the recess portion of the cam surface of the circular-shaped periphery of the lock;
n) causing the bolt to move vertically upwardly; and
o) causing the free distal end of the bolt to disengage from the one of the trio of slots, thereby allowing the bolt to be unlocked.

\* \* \* \* \*